(12) United States Patent
Kobrinsky et al.

(10) Patent No.: US 9,182,544 B2
(45) Date of Patent: Nov. 10, 2015

(54) FABRICATION OF PLANAR LIGHT-WAVE CIRCUITS (PLCS) FOR OPTICAL I/O

(75) Inventors: Mauro J. Kobrinsky, Portland, OR (US); Miriam R. Reshotko, Portland, OR (US); Ibrahim Ban, Beaverton, OR (US); Bruce A. Block, Portland, OR (US); Peter L. Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 13/976,910

(22) PCT Filed: Dec. 21, 2011

(86) PCT No.: PCT/US2011/066445
§ 371 (c)(1),
(2), (4) Date: Jun. 27, 2013

(87) PCT Pub. No.: WO2013/095426
PCT Pub. Date: Jun. 27, 2013

(65) Prior Publication Data
US 2013/0279845 A1    Oct. 24, 2013

(51) Int. Cl.
*G02B 6/12* (2006.01)
*G02B 6/136* (2006.01)
(Continued)

(52) U.S. Cl.
CPC .............. *G02B 6/12* (2013.01); *G02B 6/12004* (2013.01); *G02B 6/13* (2013.01); *G02B 6/136* (2013.01); *G02B 6/138* (2013.01); *G02B 6/421* (2013.01);
(Continued)

(58) Field of Classification Search
CPC ...... G02B 6/12; G02B 6/4214; G02B 6/4206; G02B 6/421; G02B 6/4244; G02B 6/4245; G02B 6/13; G02B 6/136; G02B 6/138; G02B 2006/12176; G02B 6/0033; G02B 6/0045; G02B 2006/12166; G02B 2006/12173; G02B 6/4283; G02B 6/428
See application file for complete search history.

(56) References Cited

U.S. PATENT DOCUMENTS 5,416,861 A    5/1995    Koh et al.
5,748,827 A    5/1998    Holl et al.
(Continued)

FOREIGN PATENT DOCUMENTS

EP    445527    *  2/1991

OTHER PUBLICATIONS

International Preliminary Report on Patentability for International Application No. PCT/US2011/066445, mailed Jul. 3, 2014, 5 pages.
(Continued)

*Primary Examiner* — Martin Angebranndt
(74) *Attorney, Agent, or Firm* — Blakely, Sokoloff, Taylor & Zafman LLP

(57) ABSTRACT

PLC architectures and fabrication techniques for providing electrical and photonic integration of a photonic components with a semiconductor substrate. In the exemplary embodiment, the PLC is to accommodate optical input and/or output (I/O) as well as electrically couple to a microelectronic chip. One or more photonic chip or optical fiber terminal may be coupled to an optical I/O of the PLC. In embodiments the PLC includes a light modulator, photodetector and coupling regions supporting the optical I/O. Spin-on electro-optic polymer (EOP) may be utilized for the modulator while a photodefinable material is employed for a mode expander in the coupling region.

20 Claims, 17 Drawing Sheets

(51) Int. Cl.
*G02B 6/138* (2006.01)
*G02B 6/13* (2006.01)
*G02B 6/42* (2006.01)
*F21V 8/00* (2006.01)

(52) U.S. Cl.
CPC ............ *G02B 6/4206* (2013.01); *G02B 6/4214* (2013.01); *G02B 6/4244* (2013.01); *G02B 6/4245* (2013.01); *G02B 6/0033* (2013.01); *G02B 6/0045* (2013.01); *G02B 2006/12166* (2013.01); *G02B 2006/12173* (2013.01); *G02B 2006/12176* (2013.01)

(56) References Cited

U.S. PATENT DOCUMENTS

| | | | |
|---|---|---|---|
| 5,757,989 A * | 5/1998 | Yoshimura et al. | 385/14 |
| 6,229,947 B1 | 5/2001 | Vawter et al. | |
| 6,737,728 B1 * | 5/2004 | Block et al. | 257/532 |
| 6,915,032 B1 | 7/2005 | White et al. | |
| 7,283,689 B1 * | 10/2007 | Block et al. | 385/2 |
| 7,316,512 B2 | 1/2008 | Shih et al. | |
| 8,401,347 B2 * | 3/2013 | Matsushima et al. | 385/14 |
| 8,666,204 B2 | 3/2014 | Wu et al. | |
| 2003/0173208 A1 * | 9/2003 | Pan et al. | 204/192.26 |
| 2005/0054199 A1 | 3/2005 | Block et al. | |
| 2006/0126987 A1 | 6/2006 | Kang et al. | |
| 2006/0210213 A1 | 9/2006 | Huang et al. | |
| 2007/0014519 A1 * | 1/2007 | Aoki | 385/50 |
| 2007/0077008 A1 | 4/2007 | Jeon et al. | |
| 2007/0081760 A1 * | 4/2007 | Lu et al. | 385/14 |
| 2008/0138009 A1 * | 6/2008 | Block et al. | 385/14 |
| 2008/0203175 A1 * | 8/2008 | Hu et al. | 235/494 |
| 2008/0246106 A1 * | 10/2008 | Beausoleil et al. | 257/432 |
| 2009/0269704 A1 | 10/2009 | Hodono | |
| 2010/0040322 A1 * | 2/2010 | Li et al. | 385/3 |
| 2010/0220957 A1 | 9/2010 | Asahi et al. | |
| 2011/0211786 A1 * | 9/2011 | Ushida et al. | 385/2 |

OTHER PUBLICATIONS

Office Action for U.S. Appl. No. 13/629,355, Mar. 25, 2014, 12 pages.
Final Office Action for U.S. Appl. No. 13/629,355, mailed Oct. 10, 2014, 22 pages.
International Search Report mailed Jul. 2, 2012 for PCT/US2011/066445, filed Dec. 21, 2011, 3 pages.
Written Opinion of the International Searching Authority mailed Jul. 2, 2012 for PCT/US2011/066445, filed Dec. 21, 2011, 3 pages.

* cited by examiner

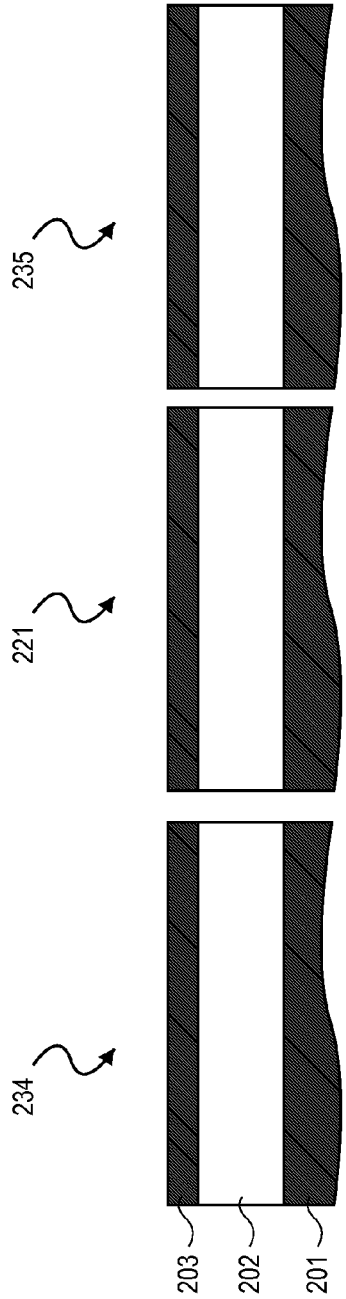
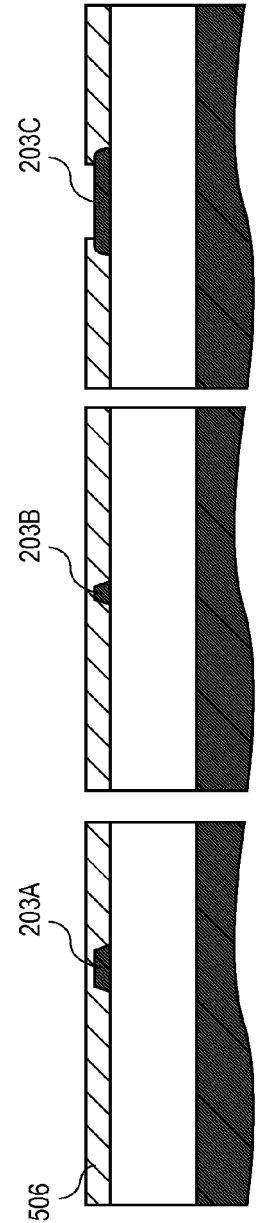
FIG. 5A
FIG. 5B

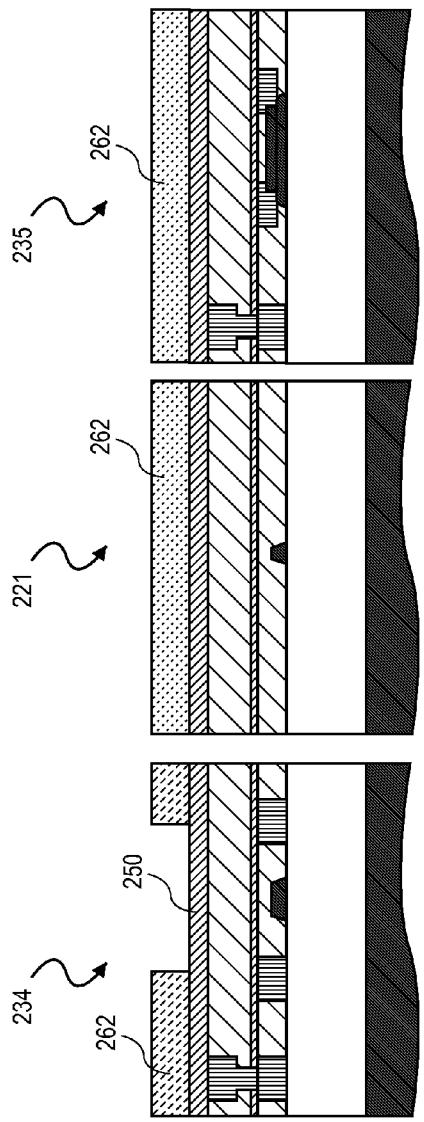
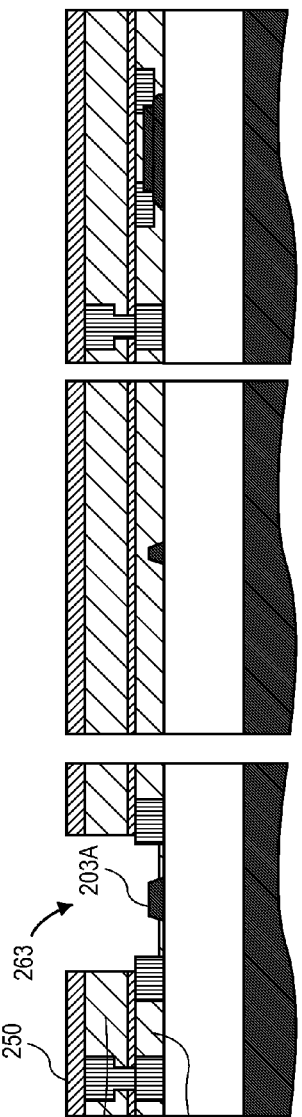
FIG. 6A
FIG. 6B

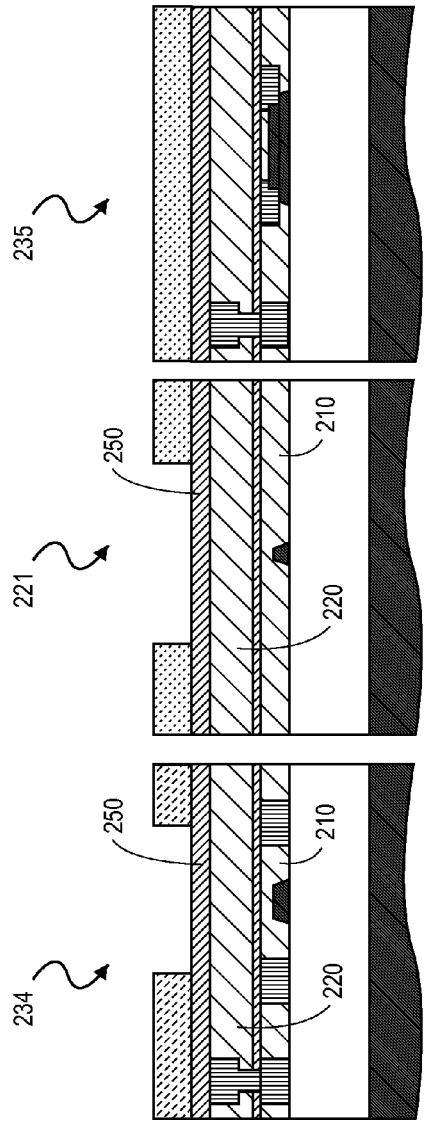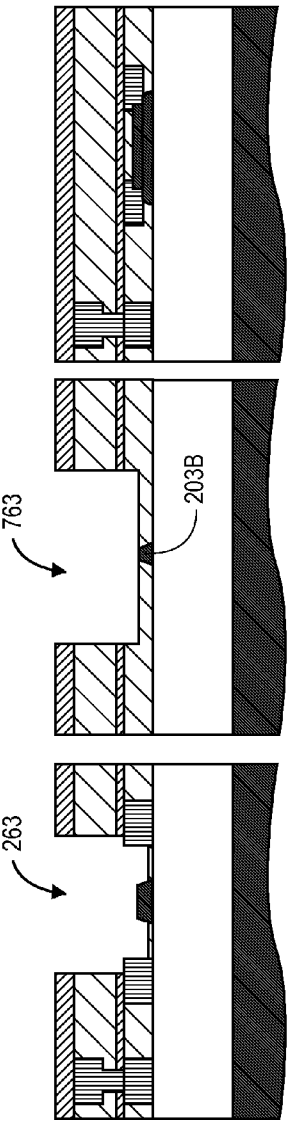
FIG. 7A
FIG. 7B

FABRICATION OF PLANAR LIGHT-WAVE CIRCUITS (PLCS) FOR OPTICAL I/O

CROSS-REFERENCE TO RELATED APPLICATION

This patent application is a U.S. National Phase Application under 35 U.S.C. §371 of International Application No. PCT/US2011/066445, filed Dec. 21, 2011, entitled FABRICATION OF PLANAR LIGHT-WAVE CIRCUITS (PLCS) FOR OPTICAL I/O.

TECHNICAL FIELD

Embodiments of the invention are generally related to semiconductor devices, and more particularly to planar lightwave circuits (PLCs) and their fabrication.

BACKGROUND

Photonic circuits are useful as optical data links in applications such as, but not limited to, high performance computing (HPC), optical memory extension (pOME), datacenters (DC), and device interconnects. For example, in mobile computing platforms a photonic IC (PIC) is a useful means of I/O to rapidly update or sync a mobile device with a host device and/or cloud service where a wireless or electrical link has insufficient bandwidth. Such optical links utilize an optical I/O interface that includes an optical transmitter and an optical receiver.

Typically, a PIC will include many photonic components such as, but not limited to, laser light sources, photo detectors, and light modulators. While monolithic integration of PICs continues to evolve, integration of separate optical components offers advantageous component flexibility. Photonic components generally need to be electrically coupled to electrical integrated circuits (EICs), for example for driving of photonic components, and further optically coupled to each other to achieve a useful photonic circuit. PLCs entail an architecture in which at least the optical coupling of photonic components is provided by a planar substrate, such as a semiconductor wafer, that is fabricated in accordance with the many techniques employed in the manufacture of EICs.

As a PLC can enable a micron-scale integration of the photonic components, such architectures and techniques for manufacturing a PLC are important for reducing manufacturing costs associated with PICs and also for reducing the form factor of a PIC, both of which is needed to increase the adoption of optical I/O.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIGS. 5A, 5B, 5C, and 5D illustrate side views of a cross-section through three regions in a PLC as the method illustrated in FIG. 4 is performed, in accordance with an embodiment;

FIGS. 6A, 6B, 6C, 6D, 6E, 6F, 6G, and 6H illustrate side views of a cross-section through three regions in a PLC as a first fabrication method illustrated in FIG. 3 is performed, in accordance with an embodiment;

FIGS. 7A, 7B, 7C, and 7D illustrate side views of a cross-section through three regions in a PLC in accordance with an alternate first fabrication method;

DETAILED DESCRIPTION

Figure 1:
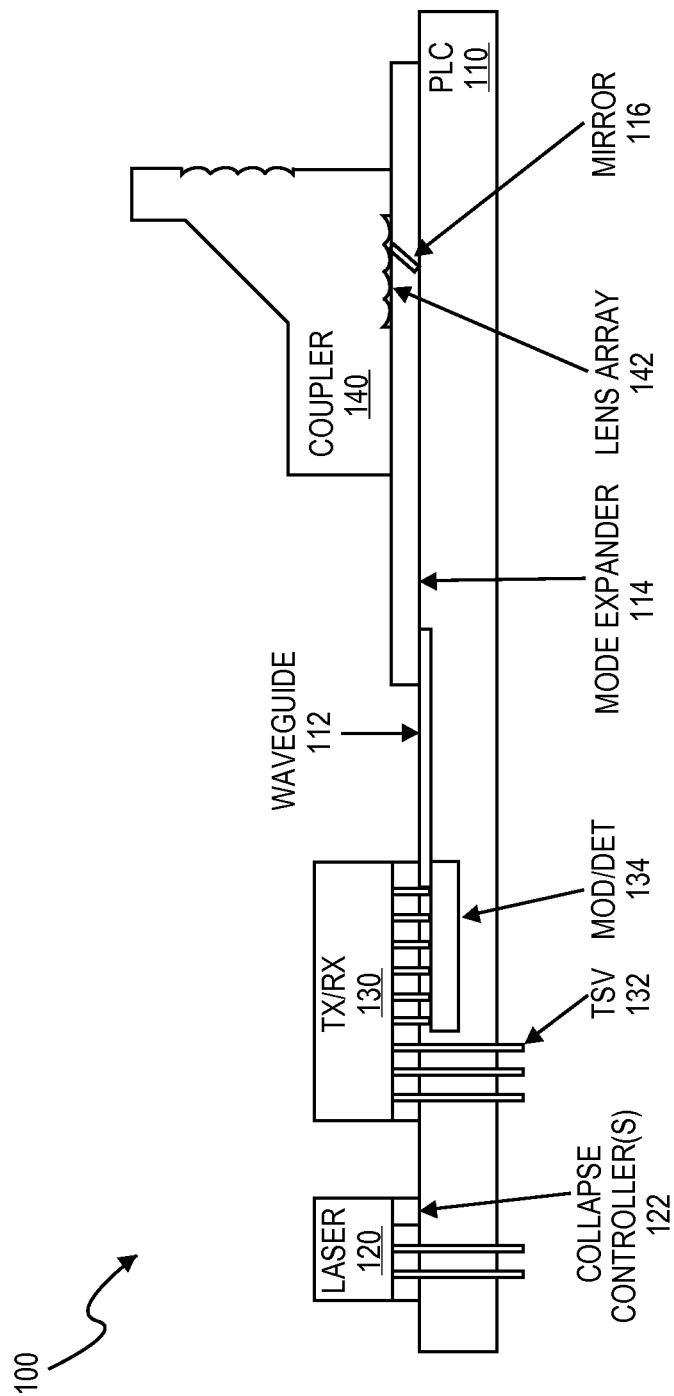
FIG. 1 illustrates a side view of a cross-section through a PLC to which laser and transceiver chips and an optical coupler are affixed, in accordance with an embodiment.

In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" my be used to indicated that two or more elements are in either direct or indirect (with other intervening elements between them) physical, optical, or electrical contact with each other, and/or that the two or more elements co-operate or interact with each other (e.g., as in a cause an effect relationship).

The terms "over," "under," "between," and "on" as used herein refer to a relative position of one component or material layer with respect to other components or layers where such physical relationships are noteworthy. For example in the context of material layers, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similar distinctions are to be made in the context of component assemblies.

Described herein are PLC architectures and fabrication techniques for providing electrical and photonic integration of photonic components with a semiconductor substrate. In the exemplary embodiment, the PLC is to accommodate optical input and/or output (I/O) as well as electrically couple to a microelectronic chip. One or more photonic chip or optical fiber terminal may be coupled to an optical I/O of the PLC. In embodiments, the PLC includes a light modulator, photodetector and coupling regions supporting the optical I/O. Spin-on electro-optic polymer may be utilized for the modulator while a photodefinable material is employed for a mode expander in the coupling region. The PLC may be attached to a substrate using conventional chip attached techniques.

FIG. 1 illustrates a side view of a cross-section through a PLC 100 to which a laser chip 120, transceiver chip 130, and an optical fiber coupler (terminal) 140 are affixed, in accordance with an embodiment. The PLC 110 may be further attached to a package substrate (not depicted) along with other chips, for example a microprocessor chip and/or memory chips. In the illustrated embodiment, the PLC 110 includes through silicon vias (TSV) 132, and so the PLC 110 has a thickness of about 200 μm, or less. However, in other embodiments where TSVs are not employed, the PLC may have a greater thickness (e.g., 300-800 μm). At least one of the laser chip 120 and transceiver chip 130 are attached to the PLC using a flip-chip, or C4 type attachment process in which specialized structures are disposed on a top surface of the PLC 110 to enable efficient light coupling from the laser chip 120 to the PLC 110 by evanescent coupling, edge coupling, grated coupling or mirror-based coupling.

Further disposed within the PLC 110 is one or more waveguide 112 which may be of any type known in the art for conducting light in a plane substantially parallel to major surfaces of the semiconductor substrate employed in the PLC 110. For example, the waveguide 112 may be a rib or ridge waveguide. In the exemplary embodiment, in addition to the waveguide 112, the PLC 110 includes optically active regions, such as, but not limited to an optical modulator array 134 and a photodetector array 134 optically coupled to one end of the waveguide 112. Optical modulator technologies relevant to the PLC 110, include, but are not limited to, ring resonators and Mach-Zehnder (MZ) architectures. The interested reader may consult U.S. Pat. Nos. 7,489,836; 7,283,689; 6,993,212; 7,948,010; 7,700,975; 7,692,258; 7,553,687; 7,084,471; 6,903,432; 6,856,129; and 6,813,431 for further description of technologies relating to modulators and photodetectors that may be utilized in the PLC 110.

Optically coupled to another end of the waveguide 112 is a mode expander (waveguide) 114 through which light is coupled to/from the PLC 110 to avoid a mismatch that would otherwise exist between the waveguide 112 (having cores in the range 0.05-1 um) and fibers external to the PLC 110 (having cores on the order of several microns for single mode fibers, and on the order of tens of microns for multimode fibers). Optically coupled to the mode expander waveguide 114 is a means, such as but not limited to a mirror 116, for vertically coupling the planar light waves through the lens array 142 and into the attached coupler (fiber terminal) 140. Alternatively, grating couplers could be used instead of a mirror.

Notably, in the exemplary embodiment the PLC 110 lacks metal-oxide-semiconductor (MOS) transistors (e.g., MOSFETs) to minimize cost of the PLC 110 and reduce integration complexity. With the laser chip 120, transceiver chip 130 (comprising MOSFETs) and coupler 140 all attached by an assembly process, overall cost of the PLC 100 can be reduced far below that of integration architectures lacking one or more of the features described herein. The close integration of PLC and CMOS also allows low power operation similar to the monolithic integrations which are far more complicated to manufacture.

Figure 2A:
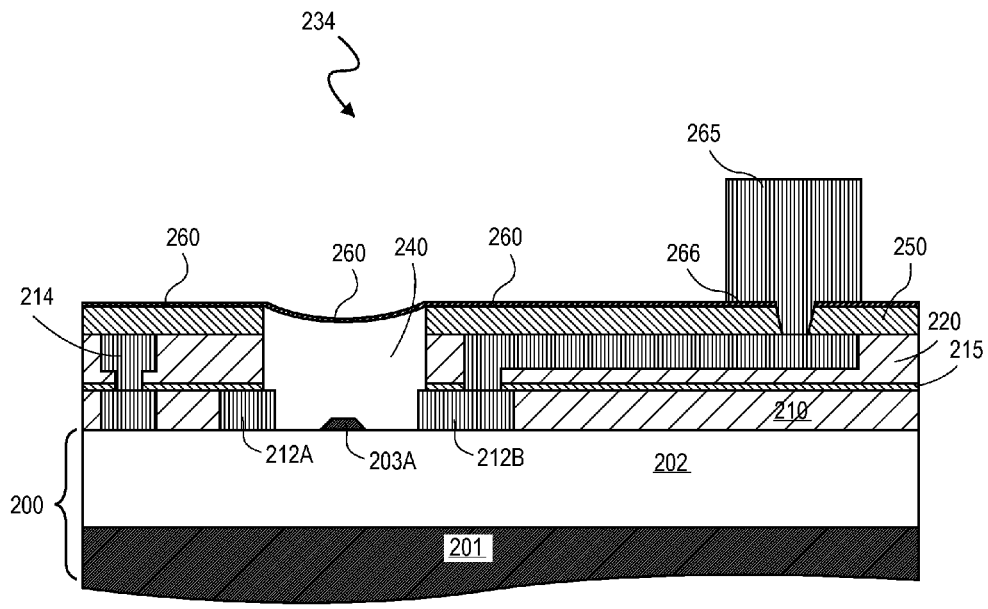
FIGS. 2A, 2B, and 2C illustrate side views of a cross-section through three regions in a PLC, in accordance with an embodiment.
Figure 2B:
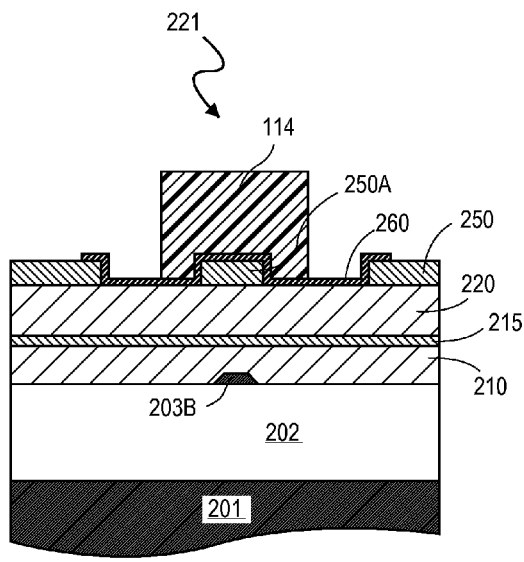
Figure 2C:
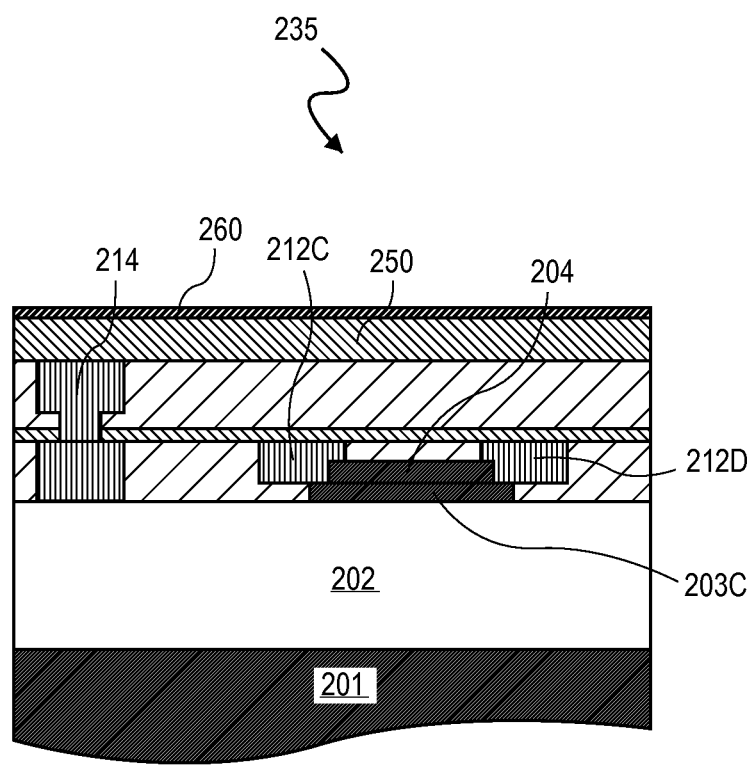

In embodiments, the PLC 110 includes a thin film stack disposed over a substrate, such as a semiconductor wafer, that is processed with CMOS-compatible techniques to leverage the vast technology deployed for conventional EICs. FIGS. 2A, 2B, and 2C illustrate side views of a cross-section through three regions in the PLC 110, in accordance with an embodiment. FIG. 2A illustrates an optical modulator region 234. FIG. 2B illustrates a coupling region 221 (representing both a first region where light is coupled from the laser chip 120 into the PLC 110 and a second region where light is coupled from the PLC 110 into the coupler 140 for a transmitter mode of operation and coupled from the coupler 140 into the PLC 110 for a receiver mode of operation). FIG. 2C illustrates a photodetector region 235. As shown in the FIGS. 2A, 2B, and 2C the PLC 110 includes a substrate 200 that in the exemplary embodiment is a silicon on insulator (SOI) substrate comprising a base semiconductor (e.g., single crystalline) 201, an insulator (e.g., ~2 μm silicon dioxide) 202 and a silicon layer (e.g., ~0.1 μm single crystalline) disposed thereon. While the exemplary embodiments are illustrated in the context of the SOI substrate, other PLC embodiments include bulk substrates (e.g., bulk silicon where waveguides may be made of SiN or SiON, or a Si/SiON bilayer).

Referring first to FIG. 2A, the modulator region 234 further includes a first waveguide 203A formed from the silicon layer disposed on the insulator 202. On either side of the first waveguide 203A are first and second modulator electrodes 212A, 212B formed in a first metal layer (e.g., including a conventional barrier liner, such as TaN, filled with Cu) and surrounded by a first interlayer dielectric (ILD) 210. Notably, the first metal is a hanging metal trench (e.g., ~0.1-1 μm in thickness) disposed in the ILD 210, lacking any landed via to the substrate. Disposed over the first ILD 210 is a second ILD 220 with an etch stop layer 215 (e.g., 10-30 nm of SiN) disposed there between. Each of the first and second ILD 210, 220 may be any conventional materials such as silicon dioxide, carbon-doped silicon dioxide, or the like, with exemplary thickness of each in the range of 0.1 μm to 1.5 μm. Electrically coupled to the second metal level 214 is under bump metallization (UBM) 266 and a bump metallization 265 (e.g., Cu), to which the transceiver chip 130 is electrically coupled and physically attached, for example. In certain embodiments, bump metallization 265 further includes solder (e.g., AgSn, Sn, SnCu, SAC305, etc.). While the bump metallization may take many forms and dimensions, exemplary bump heights $H_B$ are between 1 and 30 μm.

Disposed in the second ILD 220 is a second metal level 214 electrically coupled with the first metal level. The second metal level 214 and second ILD 220 is capped by a silicon nitride (SiN) or silicon oxynitride (SiON) layer 250. In the exemplary embodiment, the silicon nitride 250 has a thickness in the range of 0.25-1.0 μm. An electro-optic material 240 fills a recess disposed over the first waveguide 203A. Exemplary electro-optic materials include, but are not limited to, ferroelectric oxide (e.g., $LiNbO_3$), a piezoelectric material (e.g., PLTZ), Si (Si MOS capacitor), or an electro-absorption materials (III-V or Ge-based quantum well devices, where an electrical (e.g., voltage) applied to the first and second modulator electrodes 212A, 212B controls absorption of light within the material. In the preferred embodiment, the electro-optic material 240 is an electro-optic polymer (EOP) comprising chromophores that affect the propagation of light in the presence of a field applied between the modulator electrodes 212A, 212B, The EOP can be deposited by standard spin-on techniques. Exemplary EOP materials include, but are not limited to, CLD-1 and SEO-100 commercially available from Sigma Aldrich and Soluxra, respectively. In one embodiment, over the electro-optic material 240 is disposed a passivation layer 260 to protect the electro-optic material 240 and prevent moisture absorption where the material is hygroscopic (e.g., EOP). The passivation may be SiN, SiC, SiCN, or $AlO_x$ (e.g., $Al_2O_3$). Though studies of novel EOP materials with improved temperature stability are underway, a low temperature passivation material, such as $AlO_x$ is particularly advantageous as the passivation layer 260 where the electro-optic material 240 is temperature sensitive. Exemplary thicknesses for the passivation layer 260 are in the range of 5-20 nm, depending on density of the film for example.

Referring to FIG. 2B, in the coupling region 221 is a waveguide 250A in an upper waveguide level formed from the silicon nitride/oxynitride layer 250. Hence, the thickness for layer 250 is selected to accommodate the waveguiding function. Disposed over the waveguide 250A is the mode expander waveguide 114. In embodiments, the mode expander waveguide 114 is of a polymer material, preferably photodefinable. In other embodiments, the mode expander is made by using subtractive etch techniques aided by hard masks and/or resists. The upper level waveguides, like waveguide 250A, enable light coupling between the lower level (silicon) waveguide and optical components attached to the PLC 110 (e.g., laser chip 120 and coupler 140). Optical I/O for the PLC 110 is facilitated in part by the upper level waveguides. More than two waveguide levels may also be provided, for example by increasing the thickness of the etch stop 215 so that it may also be utilized as a waveguide.

With no metallization in coupling region 221, the ILDs 210, 220, and the etch stop layer 215 separate the waveguide 250A from a waveguide 203B in the lower waveguide level (e.g., formed from the silicon layer disposed on the insulator 202). In the case of evanescent coupling, efficiency of coupling between the lower level waveguide 203B and the upper level waveguide 250A is dependent on the z-height distance between the two ($D_{wg}$). The distance $D_{wg}$ is preferably less than about 1.0 μm and more optimally less than 0.6 μm. As such, the distance $D_{wg}$ is a limitation on the number of ILD and metallization layers, with more than two ILD/metallization layers generally complicating fabrication, for example necessitating a recess in the ILD 220 and thereby introducing more topography. Nonetheless, it is noted that in some embodiments, more than two metal layers may be utilized. Furthermore, in certain embodiments, the mode expander waveguide 114 may be brought closer to the waveguide 203B by replacing the upper level waveguide 250A with a region of material of appropriate optical index. In the exemplary embodiment illustrated, the electro-optical material 240 resulting in a coupling structure similar to the modulator region 234, the fabrication of which is described in more detail elsewhere herein.

Referring to FIG. 2C, the photodetector region 235 includes the majority of the thin films already described in the context of FIGS. 2A and 2B. The detector semiconductor stack includes a base semiconductor 203C formed from the silicon layer of the SOI substrate and an active semiconductor layer 204 comprising Ge (e.g., SiGe) or consisting essentially of Ge. In the exemplary embodiment, the active semiconductor layer 204 is substantially single crystalline; e.g., epitaxially following the crystallinity of the base semiconductor 203C (e.g., silicon). In other embodiments, for example where a PLC includes a bulk silicon substrate and the first level waveguides are formed from a non-crystalline material (e.g., silicon nitride or silicon dioxide), the active region 204 may be polycrystalline and preferably of large grain size.

Disposed on either side of the photodetector (e.g., electrically coupled to the active region 204) are detector electrodes 212C, 212D formed from the first metal layer like the electrodes of the modulator (212A, 212B). As such, in the exemplary embodiment illustrated, the photodetector region 235 is a metal-semiconductor-metal (MSM) detector, though other embodiments utilize a PIN photodiode. As the active semiconductor 204 is a terminal of the PLC (performing E to O conversion), the only other structures within the detector region 235 are the second ILD 220 and second metal level 214, supporting electrical routing between various regions of the PLC.

Figure 3:
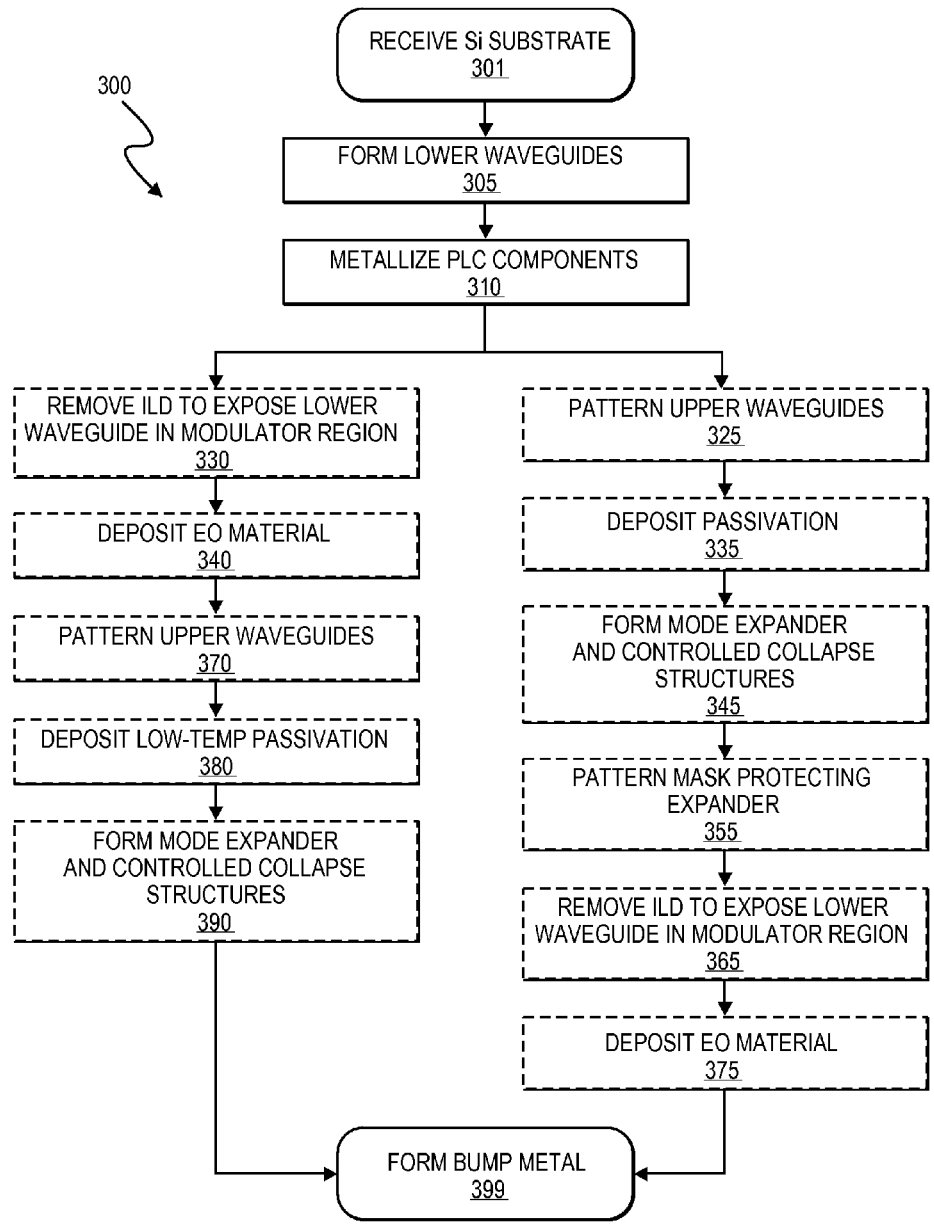
FIG. 3 is a flow diagram illustrating a method of fabricating a PLC including both electro-optical material and a photodefinable coupling material; in accordance with embodiments.

While each of the PLC regions shown in FIGS. 2A, 2B, and 2C have substantially completed fabrication, these separate regions are referred to and illustrated in the description of the flow diagram in FIG. 3. FIG. 3 illustrates a method of fabricating a PLC including both electro-optical material and a photodefinable coupling material; in accordance with embodiments. Method 300 begins at operation 301 with receipt of a silicon-based substrate. In the exemplary embodiment an SOI wafer is received as a starting material, however bulk silicon, or another material, may also be utilized though further discussion such embodiments is omitted for the sake of clarity. Beginning with the substrate, lower level waveguides are formed at operation 305 and metallization of any photonic components to be fabricated in the PLC is performed at operation 310. Such processing is common to a number of different embodiments described herein, and the initial fabrication of the base layers in the PLC film stack is further illustrated by the flow diagram of FIG. 4. FIGS. 5A, 5B, 5C, and 5D illustrate side views of a cross-section through three regions in a PLC as the method illustrated in FIG. 4 is performed, in accordance with an embodiment.

Figure 4:
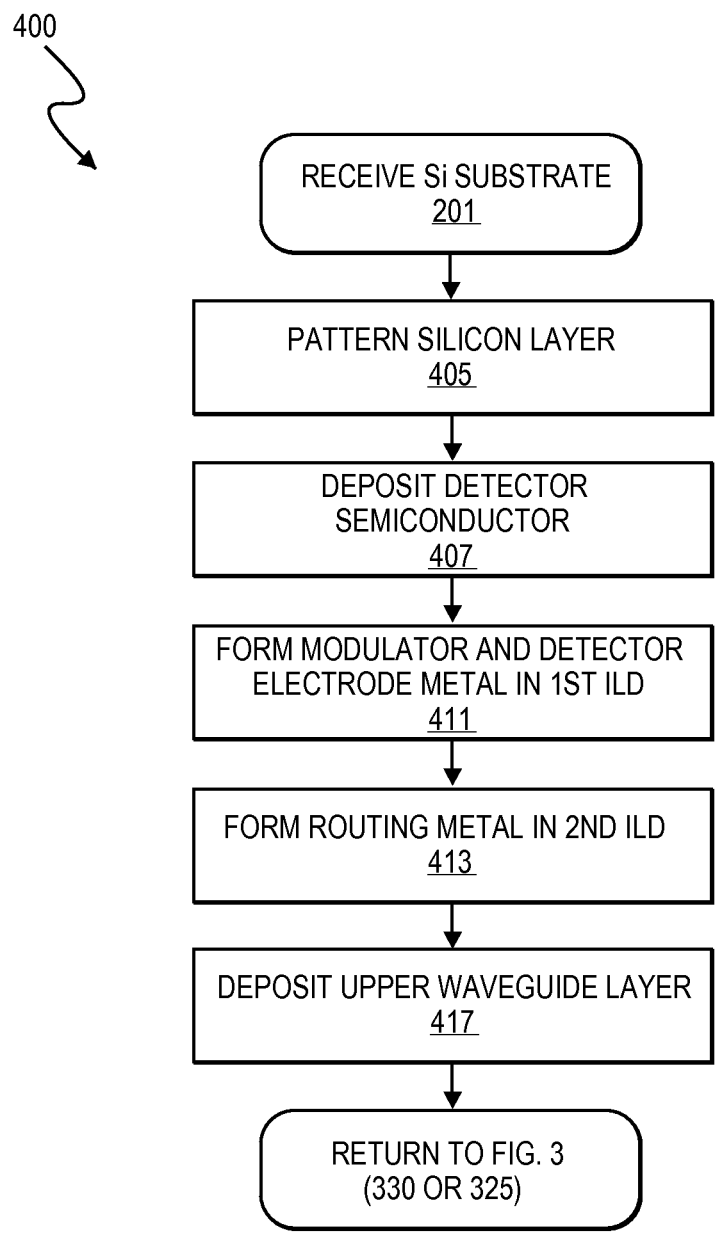
FIG. 4 is a flow diagram illustrating a method of forming base layers of the PLC illustrated in FIG. 1, in accordance with an embodiment.

Referring to FIG. 4, following receipt of the silicon substrate (e.g., SOD at operation 201, the modulator region 234, coupling region 221, and photodetector region 235 are as illustrated in FIG. 5A. At operation 405 (FIG. 4), the silicon layer (typically 50-150 nm thick) disposed on the insulator is patterned. For example as shown in FIG. 5B, the silicon layer 203 is patterned using conventional dry etch techniques into the lower level waveguides 203A, 203B and a detector base 203C. A dielectric layer 506, having good index contrast with the lower level waveguides, such as silicon dioxide, is then deposited over the lower level waveguides 203A, 203B and over the detector base 203C. The dielectric layer 506 is then pattern to expose the detector base 203C.

Returning to FIG. 4, photodetector semiconductor is deposited at operation 407. For the exemplary embodiment illustrated in FIG. 5C, a SiGe or pure Ge film is epitaxially grown from the detector base 203C to form the active semiconductor layer 204. In other embodiments, a CVD process may be utilized to grow a polysilicon SiGe or polysilicon Ge film on an amorphous (e.g., SiO2, SiN) or polycrystalline base layer. Following formation of the active semiconductor layer 204, the first ILD 210 (e.g., silicon dioxide) is deposited over the substrate to the thickness described elsewhere herein.

Figure 5C:
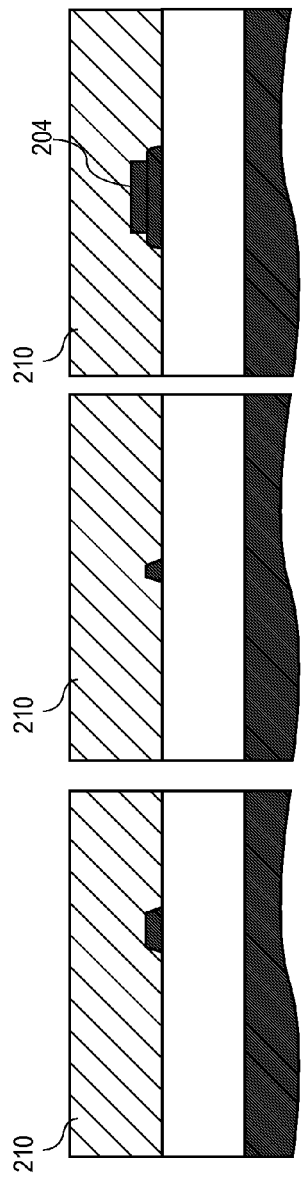
Figure 5D:
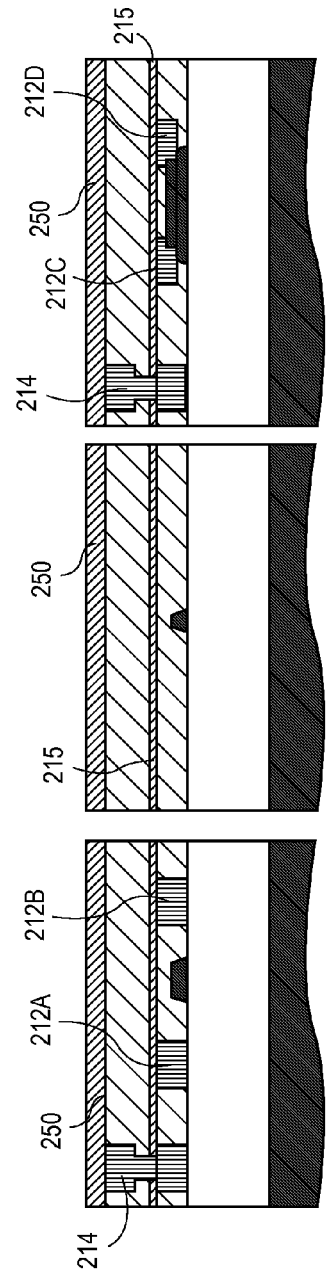

Returning to FIG. 4, at operations 411 and 413 standard damascene metallization flows are employed to form two metal layers. Referring to FIG. 5D, the modulator and detector electrodes 212A, 212B, 212C, and 212D are formed with the first metal level. In the exemplary embodiment, the first metal level comprises a single damascene process as no vias are formed to the substrate. Between interconnect levels, the etch stop layer 215 is deposited, for example by PECVD. Notably, the etch stop layer 215, of SiN or SiON material, requires a relatively high deposition temperature (e.g., 400° C.) that is too high for many known EOPs. As such, EOP deposition is delayed until later in the process. At operation 413 (FIG. 4) a conventional dual damascene process is employed, for example to form routing metal traces in the second metal level 214, as shown in FIG. 5D.

Returning to FIG. 4, following the interconnect metallization, an upper waveguide layer is deposited at operation 417. FIG. 5D further illustrates the exemplary upper level waveguide layer 250 of SiN or SiON. Again, the PECVD process employed in the formation of the upper level waveguide layer 250 is too high for compatibility with many known EOP materials. After formation of the upper waveguide layer, the method 400 is complete and the process flow returns to FIG. 3 where the method 300 bifurcates into two alternative process flows. One alternative may be considered an "EOP first" flow where the electro-optic material is deposited in at least the modulator region 234 before formation of the mode expander in the coupling region 221. This embodiment of method 300 continues at operation 330 with FIGS. 6A, 6B, 6C, 6D, 6E, 6F, 6G, and 6H illustrating side views of a cross-section through three regions in a PLC as one exemplary "EOP first" embodiment is performed. Another alternative may be considered an "EOP last" flow where the electro-optic material is deposited in at least the modulator region 234 after formation of the mode expander in the coupling region 221. This embodiment of method 300 continues at operation 325 with FIGS. 8A, 8B, 8C, 8D, 8E, and 8F illustrating side views of a cross-section through three regions in a PLC as one exemplary "EOP last" embodiment.

Generally, the "EOP first" embodiment is most advantageous where a spin-on process is employed for deposition of the electro-optical material because complications due to subsequently formed topography (e.g., potentially leading EOP coat striations) are avoided. However, in "EOP first" embodiments where the electro-optical material has low thermal stability, for example where the EOP performance degrades at temperatures above 200-250° C., subsequent formation of the mode expander and/or passivation layers can be challenging.

Referring to FIG. 3, at operation 330 the upper waveguide layer and ILD disposed over the lower level waveguide is opened in the modulator region 234. As illustrated in FIG. 6A, a photoresist 262 is patterned (e.g., spin/expose/develop) to open the upper waveguide layer 250 and, as shown in FIG. 6B, a recess 263 is etched ILD 220, 210 to expose the waveguide 203A. In the exemplary embodiment, during the modulator recess etch, the coupling region 221 and photodetector region 235 remain masked.

Continuing with the method 300, at operation 340 the electro-optical material is deposited using any process applicable for the chosen material. In the exemplary embodiment illustrated in FIG. 6C, an EOP 240 is spun on to fill the recess 263 and to cover the upper level waveguide layer 250. The EOP is then poled and cured, for example with contacts to the second metal level 214 utilized to place a field across the modulator electrodes 212A, 212B while the EOP is heated to an elevated temperature (e.g., 150-250° C.). The EOP poling material is then etched back, as further illustrated in FIG. 6D, removing the EOP 240 from the upper level waveguide layer 250 which is then patterned into the upper level waveguides at operation 370 (FIG. 3). Referring to the exemplary embodiment illustrated by FIG. 6E, a photoresist 264 is patterned in the coupling region 221 and the upper level waveguide layer 250 layer etched, for example with any silicon nitride or SiON plasma etch process known in the art to form the waveguide 250A disposed directly over the waveguide 203B.

With the upper level waveguides formed, the "EOP first" embodiment continues at operation 380 with deposition of a low-temperature passivation over the EOP and over the upper level waveguides. In the exemplary embodiment illustrated in FIG. 6F, the low-temperature passivation layer 260 is a SiN or an AlO$_x$ layer (e.g., Al$_2$O$_3$) deposited at a temperature below 200° C. and preferably at about 150° C. and below. In the case of a SiN layer, it can be deposited by sputtering or low temperature Chemical Vapor Deposition (CVD). In the case of an AlO$_x$ layer, it may be deposited by sputter deposition or preferably by a true atomic layer deposition technique (e.g., with a sequence TMA and H$_2$O cycles). Because of the high film density of AlO$_x$ and excellent step coverage possible with ALD (e.g., >95%), hermeticity may be achieved with only a 5-20 nm film.

Following passivation, at operation 390 (FIG. 3) the mode expander is formed over at least the upper level waveguide in the coupling region 221. In the exemplary embodiment illustrated in FIG. 6G, formation of the mode expander waveguide 114 entails a spin/expose/develop and cure process to photo-define the mode expander waveguide 114. While there are many suitable photodefinable material commercially available, one example is the WPR line of photoresists commercially available from DuPont, Inc. In still other embodiments, conventional subtractive techniques are employed to define a mode expander using non-photodefinable polymers such as PFCB, or SiON. In particular embodiments where the PLC 110 includes the mirrors 116, grayscale lithography may be employed to form the mirror 116 with the same photodefinable material during the operation 390. In further embodiments, also at operation 390, the photodefinable material (e.g., WPR) is further patterned into the collapse controllers 122. As such, the thickness (z-height) of the WPR structures may range from 1-15 μm for each of the mode expander waveguide 114, mirrors 116, and coupling structures 122.

Figure 6C:
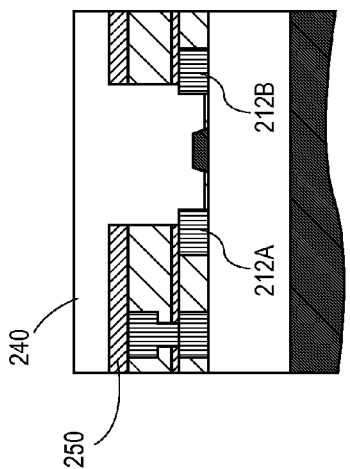
Figure 6C:
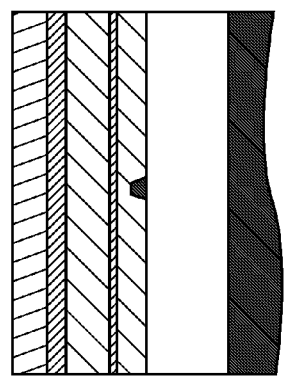
Figure 6C:
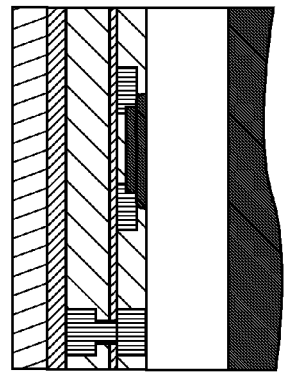
Figure 6D:
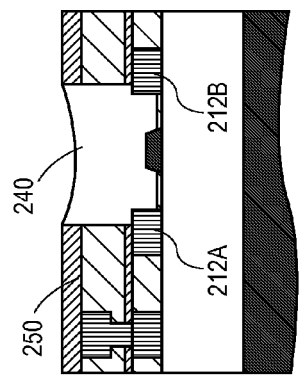
Figure 6D:
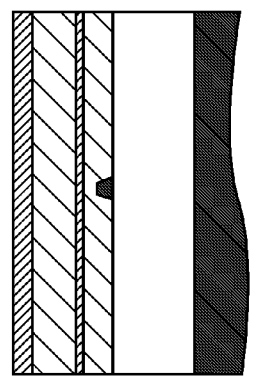
Figure 6D:
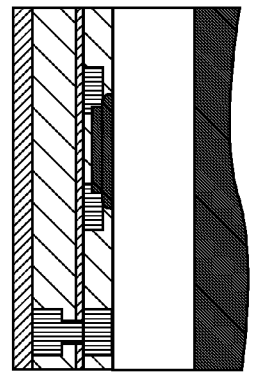
Figure 6E:
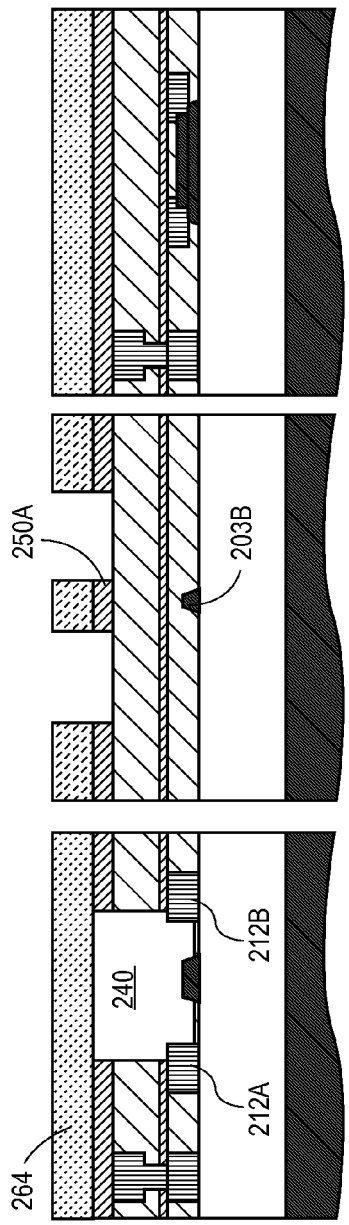
Figure 6F:
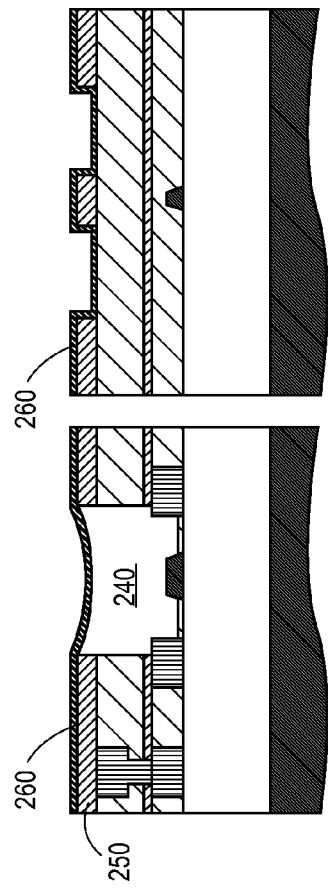
Figure 6G:
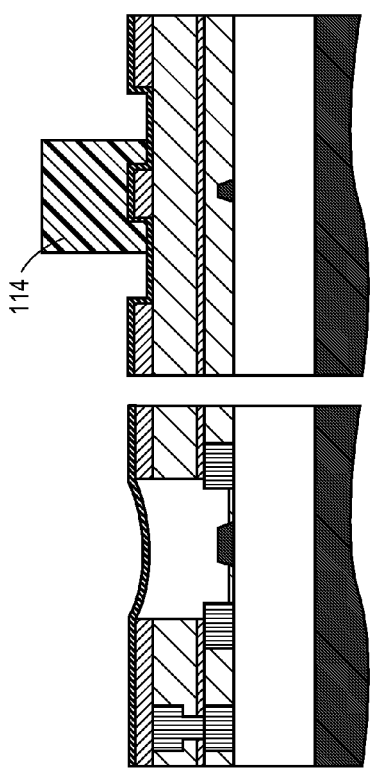
Figure 6H:
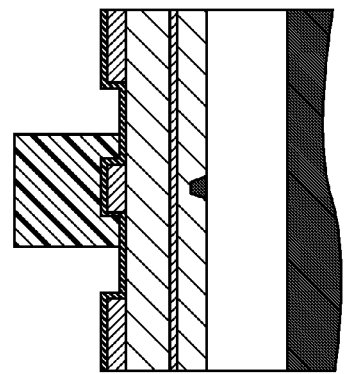
Figure 6H:
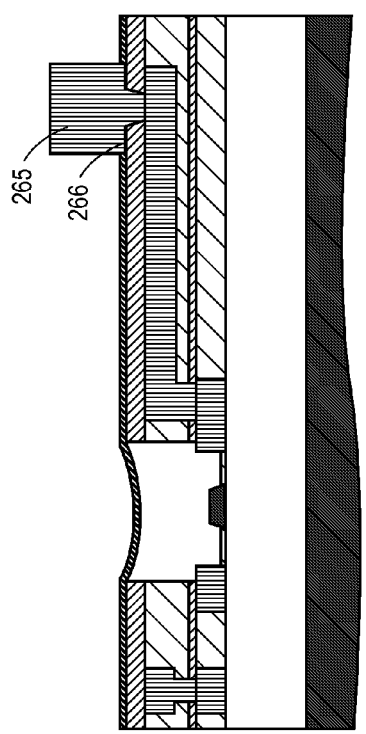

At operation 399, the "EOP first" embodiment of the method 300 is completed with a bump process to form the bump pad metallization illustrated in FIG. 6H to include the UBM 266 and bump posts or pads 265 to an appropriate z-height for the chip attachment process to be employed. Generally, any bump process known in the art may be practiced once the passivation layer 260 is opened over the second metal level pads which are to be bumped by a plating metal (e.g., Cu). Where AlO$_x$ or SiN is employed as the passivation layer 260, a dry etch may be performed. A barrier and seed is then deposited, bump resist is patterned (over the mode expander waveguide 114, mirrors 116, and collapse controllers 122), bump and/or solder is plated, bump resist stripped and the seed and barrier wet etched.

Figure 7C:
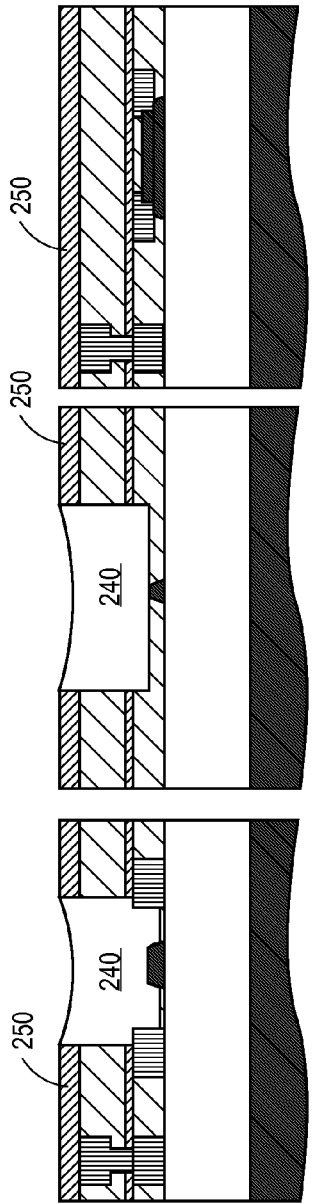
Figure 7D:
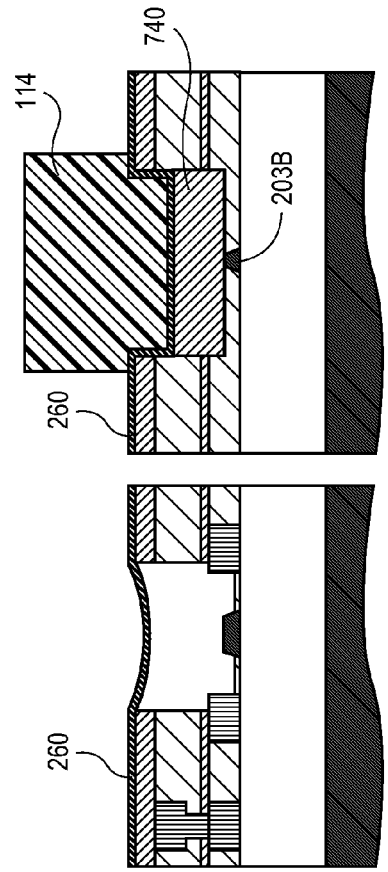

Completing the description of the "EOP first" embodiment of the method 300, FIGS. 7A, 7B, 7C, and 7D illustrate side views of a cross-section through three regions in a PLC in accordance with an alternate implementation whereby the mode expander waveguide 114 (i.e., coupler 140) is brought closer to the lower level waveguide (e.g., waveguide 203B) for improved coupling efficiency. As shown in FIGS. 7A and 7B, for such embodiments the upper waveguide layer 250 and ILD 210, 220 is etched over the waveguide 203B to form a recess 763 substantially as described for the waveguide 203A in the modulator region 234. At operation 340, the recess 763 is filled with the EOP (along with the recess 263 in the modulator region 234). FIG. 7C illustrates the modulator and coupling regions after polling and etch back of the EOP. As shown in FIG. 7D, photodefinition of the mode expander waveguide 114 then proceeds as described elsewhere herein, however with only the material of desired optical index (e.g., EOP 740) disposed between the mode expander waveguide 114 and the lower level waveguide 203B.

Figure 8A:
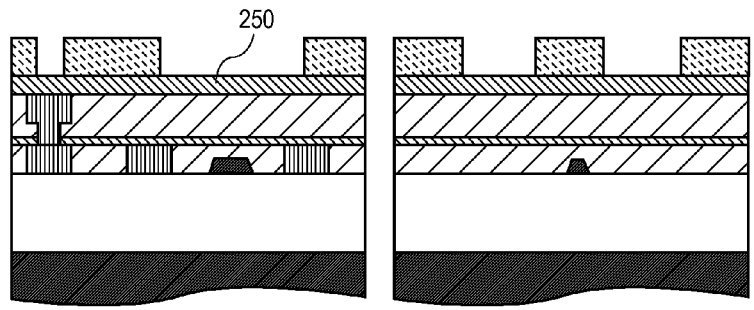
FIGS. 8A, 8B, 8C, 8D, 8E, and 8F illustrate side views of a cross-section through three regions in a PLC as a second fabrication method illustrated in FIG. 3 is performed, in accordance with an embodiment.
Figure 8B:
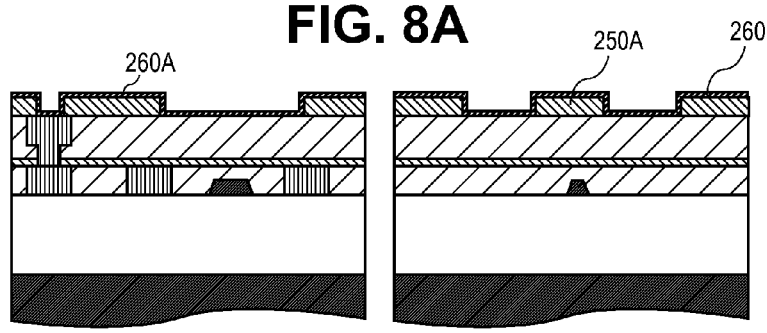

Turning now to the "EOP last" embodiments of the method 300, it is first noted that such embodiments advantageously minimize the EOP thermal budget (time at elevated temperatures). For EOP materials that have a high risk of thermal degradation, EOP last embodiments have certain advantages over the EOP-first embodiments. Beginning with operation 325, the upper waveguides are patterned at operation 325. As shown in FIG. 8A, patterning of the upper waveguide layer 250 is performed in both the modulator and coupling regions. At operation 335 (FIG. 3), a passivation layer is deposited over the patterned waveguide layer. In the exemplary embodiment illustrated in FIG. 8B, a PECVD SiN or SiON process is employed to deposit the passivation layer 260A.

Figure 8C:
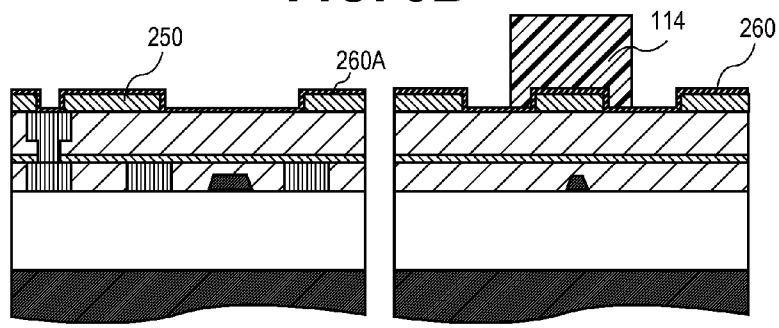

Next, at operation 345 the mode expanders, mirrors, and coupling structures are formed substantially as described elsewhere herein in reference to operation 390 for the "EOP first" embodiments. FIG. 8C further illustrates the mode expander waveguide 114 as formed directly on the waveguide 203A. At operation 355, a mask is patterned to protect at least the mode expander and potentially also the coupling structures and mirrors, depending on whether the photodefinable material employed for these structures was deposited with the target z-height or whether a controlled erosion rate is factored into the as-deposited z-height. In the exemplary embodiment illustrated in FIG. 8D, the mask 824 is photoresist applied and patterned to protect the mode expander waveguide 114, the coupling structures 122, and mirrors 116 (not depicted) during subsequent processing. Alternatively, a SiN, SiC, SiCN, AlOx, Ti, TiN or similar material can be deposited and patterned to cover these same structures. Such alternatives preferably utilize thin and permanent layers though thicker sacrificial layers are also possible.

Figure 8D:
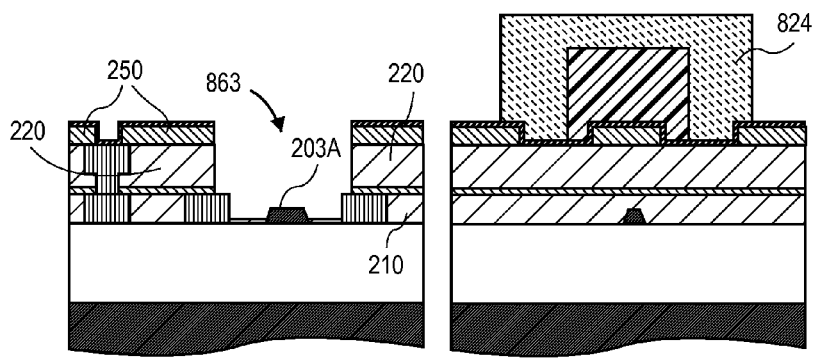
Figure 8E:
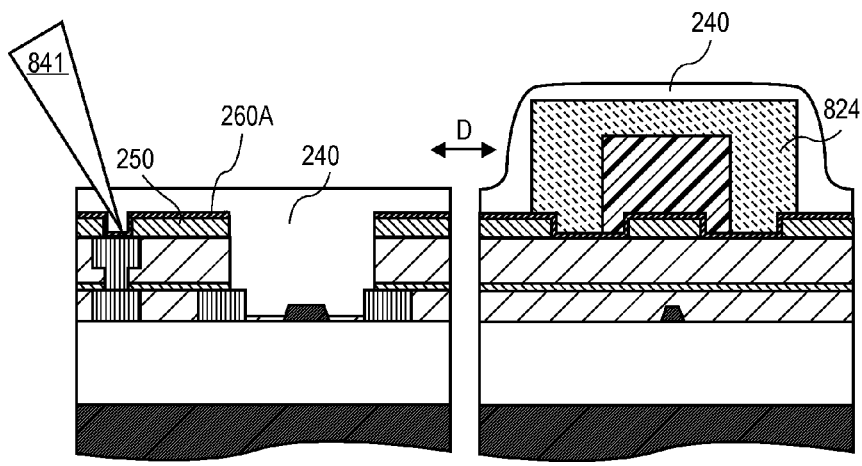
Figure 8F:
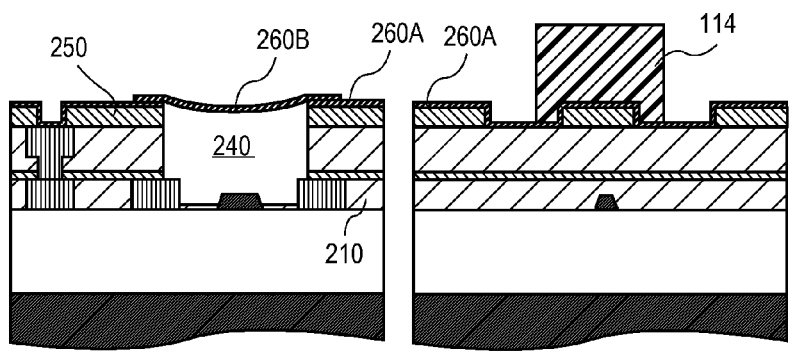

At operation 365, the ILD is removed from the modulator region 234 to expose the lower level waveguide over which electro-optical material is to be deposited. Referring still to FIG. 8D, in the exemplary embodiment the upper waveguide layer 250 serves as a hardmask in the modulator region 234 during an etch of the ILDs 210, 220 to expose the waveguide 203A within a recess 863. At this point, the electro-optical material is deposited (operation 375 in FIG. 3). In the exemplary embodiment illustrated in FIG. 8E, an EOP 240 is spun-on (e.g., to a thickness of 7-8 μm) to fill the recess 863 and coat the upper waveguide layer 250. As noted in FIG. 8E, it is advantageous to have the mask 824 disposed a distance D (e.g., at least 1.0 mm) from the recess 863 to avoid coat induced defects from adversely affecting the modulator region 234 (e.g., causing striations preventing a fill of the recess 863). In certain advantageous embodiments, to prevent structures with large z-height (e.g., coupling structures, mirrors, mode expanders) from inducing striations in the EOP, a photo resist is applied for planarization before EOP spin with the photoresist first exposed out of the recess 863 (as well as exposed out of the poling pads).

The EOP material is then poled (with the probe 841 going through the EOP), cured, and etched back from the field substantially as described elsewhere herein in the context of the "EOP first" embodiment. The mask 824 is then removed and the passivation layer 260B is deposited over the EOP 240, the mode expander waveguide 114, mirrors 116, and coupling structures 122. As described elsewhere herein, the passivation layer 260B is advantageously deposited at a temperature below 200° C., and preferably at about 150° C., or less, where the EOP thermal stability is insufficient to accommodate typical PECVD temperatures. The method 300 then completes at operation 399 with bump formation substantially as was described elsewhere herein for the "EOP first" embodiments.

Figure 9:
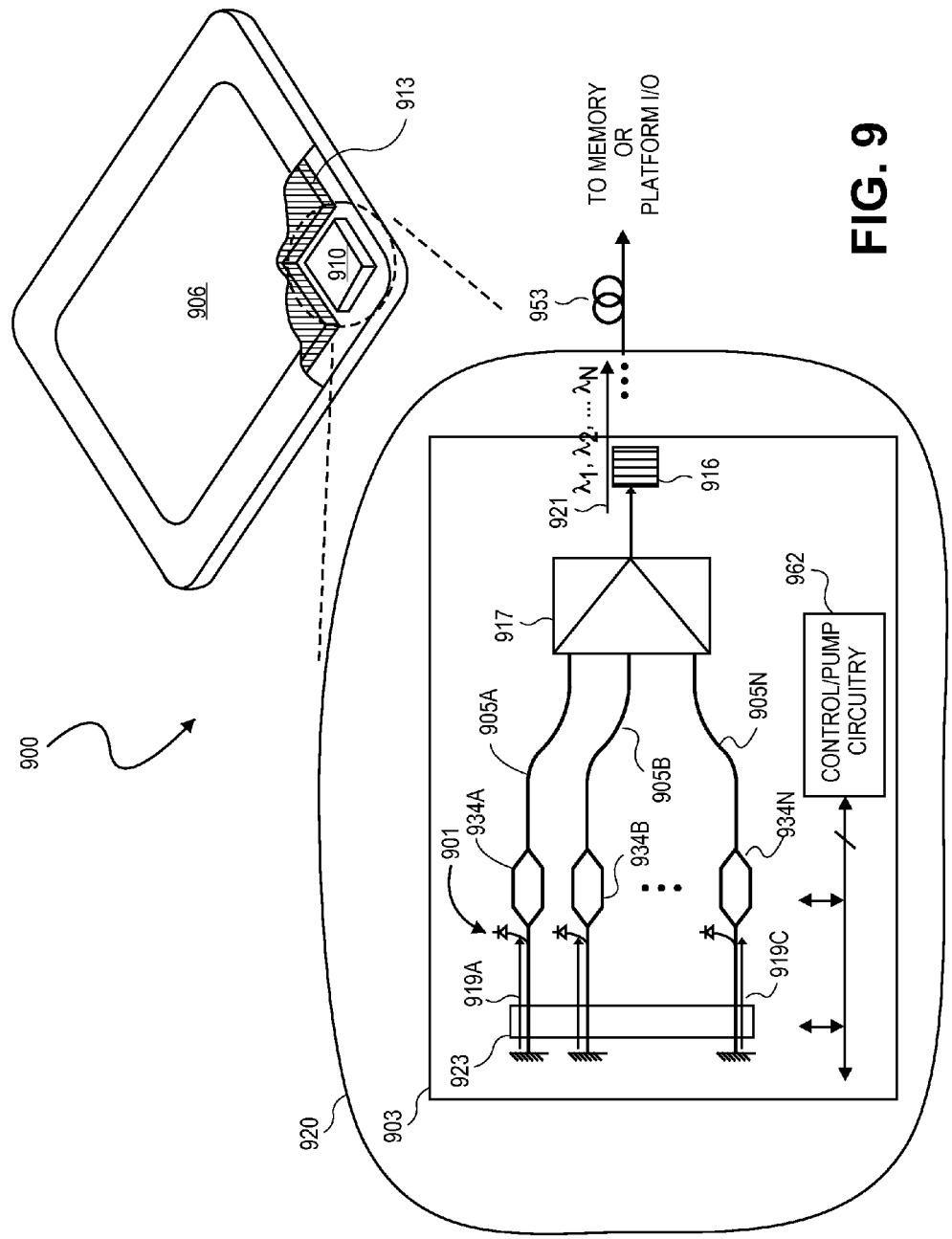
FIG. 9 is a schematic diagram of a mobile device including an optical transmitter, in accordance with embodiments of the present invention.

While the PLC architectures and fabrication techniques described herein may be utilized within many system-level applications, FIG. 9 is a schematic diagram of a mobile computing platform including an optical transmitter in accordance with embodiments of the present invention.

The mobile computing platform 900 may be any portable device configured for each of electronic data display, electronic data processing, and wireless electronic data transmission. For example, mobile computing platform 900 may be any of a laptop, a netbook, a notebook, an ultrabook, a tablet, a smart phone, etc. and includes a display screen 906, which may be a touchscreen (e.g., capacitive, resistive, etc.) the optical transmitter 910, and a battery 913.

The optical transmitter 910 is further illustrated in the expanded functional block view 920 illustrating an array of electrically pumped lasers 901 controlled by circuitry 962 coupled to a passive semiconductor layer over, on, or in, substrate 903. The PLC 903 further includes a plurality of optical waveguides 905A-905N over which a laser chip 923 is mounted. During operation, a plurality of optical beams 919A-919N are generated by the laser chip 923 and transported through the plurality of optical waveguides 905A-905N in the PLC 903. The plurality of optical beams 919A-919N are modulated by modulators 934A-934N and then selected wavelengths of the plurality of optical beams 919A-919N are combined in with optical multiplexer 917 to output a single optical beam 921, which is then to be vertically coupled via mirror 916 into an optical wire (fiber) 953. The optical wire 953 is further coupled to a downstream optical receiver external to the mobile computing platform 900 (i.e., coupled through the platform optical I/O terminal) or is further coupled to a downstream optical receiver internal to the mobile computing platform 900 (i.e., a memory module).

In one embodiment, the optical wire (fiber) 953 is capable of transmitting data at the multiple wavelengths included in the optical beam 921 at speeds of at least 25 Gb/s and potentially more than 1 Tb/s. In one example, the plurality of optical waveguides 905A-905N are in a single silicon layer for an entire bus of optical data occupying a PLC 903 having a dimension of less than 5 mm on a side.

Figure 10:
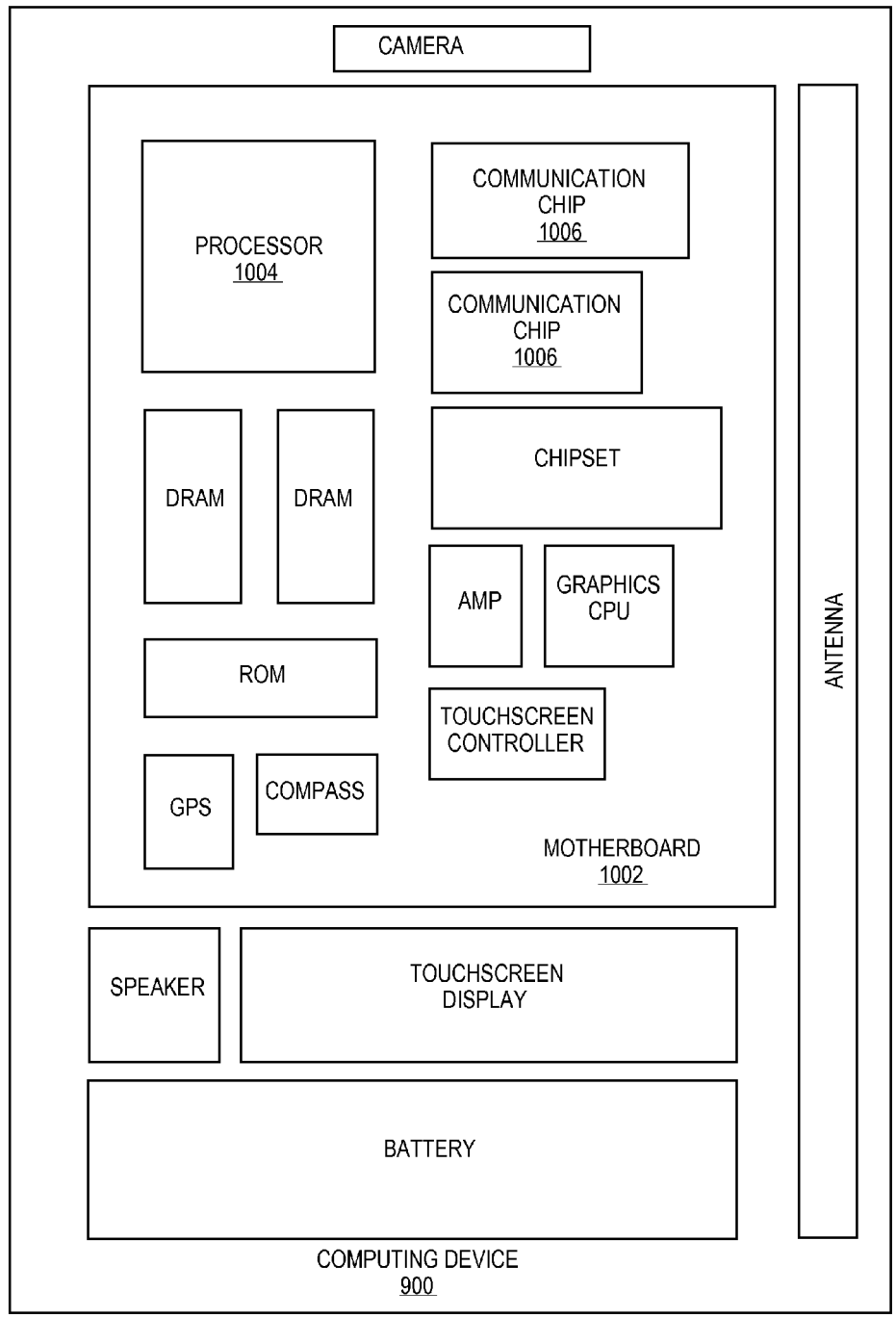
FIG. 10, is a function block diagram of the mobile device illustrated in FIG. 9, in accordance with an embodiment of the present invention.

FIG. 10 is a functional block diagram of the mobile computing platform 900 in accordance with one embodiment of the invention. The mobile computing platform 900 includes a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004. Depending on its applications, mobile computing platform 900 may include other components that may or may not be physically and electrically coupled to the board 1002. These other components include, but are not limited to, volatile memory (e.g., DRAM), non-volatile memory (e.g., ROM), flash memory, a graphics processor, a digital signal processor, a crypto processor, a chipset, an antenna, touchscreen display, touchscreen controller, battery, audio codec, video codec, power amplifier, global positioning system (GPS) device, compass, accelerometer, gyroscope, speaker, camera, and mass storage device (such as hard disk drive, solid state drive (SSD), compact disk (CD), digital versatile disk (DVD), and so forth).

At least one of the communication chips 1006 enables wireless communications for the transfer of data to and from the mobile computing platform 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 9G, 5G, and beyond. The mobile computing platform 900 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 includes an integrated circuit die packaged within the processor 1004. The term "processor" may refer to any device or portion of a device that processes electronic data from registers and/or memory to transform that electronic data into other electronic data that may be stored in registers and/or memory. Either of the communications chip 1006 may entail an optical transceiver including the PLC 110, substantially as described elsewhere herein.

It is to be understood that the above description is illustrative, and not restrictive. For example, while flow diagrams in the figures show a particular order of operations performed by certain embodiments of the invention, it should be understood that such order may not be required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method of forming a planar light-wave circuit, the method comprising:
    patterning a first layer disposed on a substrate to form waveguides;
    forming modulator electrodes in a first metal level, surrounded by a first interlayer dielectric, and disposed over the substrate;
    forming routing interconnect, surrounded by a second interlayer dielectric, in at least a second metal level disposed over the first metal level, wherein portions of the first metal level is separated from the second metal level by the second interlayer dielectric;
    depositing an electro-optic material in a first recess disposed over a first waveguide in a first waveguide level and adjacent to the modulator electrodes;
    photo defining an optical mode expander in a material disposed over a second waveguide in a second waveguide level, wherein the first and second waveguide levels are different; and
    forming bump metallization disposed over, and coupled to, the routing interconnect.

2. The method of claim 1, wherein depositing the electro-optic material further comprises:
    spinning on an electro-optic polymer (EOP), and wherein the method further comprises:
    poling and curing the EOP; and
    etching back the EOP.

3. The method of claim 2, further comprising depositing a passivation layer over the EOP at a temperature below 200° C.

4. The method of claim 3, wherein the passivation layer comprises $AlO_x$.

5. The method of claim 3, the method further comprising patterning a second layer disposed over the first metal level to form the second waveguide in the second waveguide level after spinning on the EOP, and wherein the mode expander is formed from first photo definable material disposed over the second waveguide.

6. The method of claim 2, further comprising depositing the EOP in a second recess disposed over the second waveguide in the first waveguide level; and wherein the mode expander is formed over the second waveguide with the EOP disposed there between.

7. The method of claim 2, wherein the substrate is a silicon on insulator (SOI) substrate, the first layer being the silicon disposed on the insulator, and wherein the second layer comprises silicon nitride.

8. The method of claim 2, wherein the EOP is spun on after the optical mode expander is formed, the method further comprising:
    forming a mask to protect the mode expander during the EOP etchback.

9. The method of claim 8, wherein forming a mask to protect the mode expander further comprises patterning a photodefinable polymer over at least the expander prior to spinning on the EOP.

10. The method of claim 9, further comprising forming a mirror adjacent to the mode expander with a grayscale lithography process, and wherein the photodefinable polymer is disposed over the mirror prior to spinning on the EOP.

11. The method of claim 10, wherein the first layer is a silicon layer disposed on the insulator of a silicon-on-insulator (SOI) substrate, and wherein depositing the semiconductor layer comprising Ge further comprises epitaxially growing the semiconductor layer using the silicon layer as a seed crystal.

12. The method of claim 8, further comprising:
    planarizing the mode expander with a photoresist coat; and
    exposing the planarizing photoresist to remove the planarizing photoresist from the first recess prior to spinning on the EOP.

13. The method of claim 1, wherein forming the bump metallization further comprises:
    opening the passivation layer over metal interconnect pads without exposing the EOP;
    patterning bump resist;
    plating the bumps; and
    removing the bump resist.

14. The method of claim 1, wherein the method further comprises forming an active detector layer by depositing a semiconductor layer comprising Ge over the substrate; and
    forming detector electrode in the first metal level and coupled to the active detector layer.

15. A planar light-wave circuit (PLC), comprising:
- a first waveguide in a first waveguide level disposed over a substrate;
- modulator electrodes in a first metal level, surrounded by a first interlayer dielectric, and disposed over the substrate;
- routing interconnect in at least a second metal level, surrounded by a second interlayer dielectric, and disposed over the first metal level, wherein portions of the first metal level is separated from the second metal level by the second interlayer dielectric;
- an electro-optic material in a first recess disposed over the first waveguide and adjacent to the modulator electrodes;
- an optical mode expander comprising a first photo definable material disposed over a second waveguide in a second waveguide level; and
- bump metallization disposed over, and coupled to, the routing interconnect.

16. The PLC of claim 15, wherein the electro-optic material is an electro-optic polymer (EOP) and wherein an $AlO_x$ passivation is disposed over the EOP to provide a hermetic barrier.

17. The PLC of claim 15, wherein a bottom of the mode expander is disposed a z-height from a top of the first waveguide that is less than 1.0 μm.

18. The PLC of claim 17, further comprising a third waveguide in a material layer disposed between the mode expander and the second waveguide, the mode expander disposed on the second waveguide and at least one of EOP and an interlayer dielectric layer disposed between the second and third waveguide.

19. The PLC of claim 18, further comprising a photodetector comprising Ge, the photodetector having electrodes employing the first metal level.

20. The PLC of claim 19, wherein the substrate is a silicon on insulator (SOI) substrate, the first waveguide comprising the silicon disposed on the insulator, and wherein the second waveguide comprises silicon nitride.

* * * * *